US012697894B2

(12) United States Patent (10) Patent No.: US 12,697,894 B2
Ceylan et al. (45) Date of Patent: Aug. 4, 2026

(54) METHOD FOR ASSIGNING VEHICLES TO CHARGING STATIONS, AND CHARGING SYSTEM

(71) Applicant: MERCEDES-BENZ GROUP AG, Stuttgart (DE)

(72) Inventors: Musa Ceylan, Böblingen (DE); Osman Aydin, Leinfelden-Echterdingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 54 days.

(21) Appl. No.: 18/856,312

(22) PCT Filed: Mar. 24, 2023

(86) PCT No.: PCT/EP2023/057598

§ 371 (c)(1),
(2) Date: Oct. 11, 2024

(87) PCT Pub. No.: WO2023/198428

PCT Pub. Date: Oct. 19, 2023

(65) Prior Publication Data

US 2025/0262972 A1 Aug. 21, 2025

(30) Foreign Application Priority Data

Apr. 12, 2022 (DE) ..................... 10 2022 001 267.7

(51) Int. Cl.
B60L 53/66 (2019.01)
B60L 53/30 (2019.01)
(Continued)

(52) U.S. Cl.
CPC ............. B60L 53/66 (2019.02); B60L 53/305 (2019.02); B60L 53/62 (2019.02); B60L 53/65 (2019.02); B60L 53/68 (2019.02)

(58) Field of Classification Search
CPC ........ B60L 53/66; B60L 53/305; B60L 53/62; B60L 53/65; B60L 53/68; Y02T 10/70;
(Continued)

(56) References Cited

U.S. PATENT DOCUMENTS 10,065,526 B2 9/2018 Hare et al.
10,953,767 B2 3/2021 Loghavi et al.
(Continued)

FOREIGN PATENT DOCUMENTS

DE 102010047676 A1 4/2012
DE 102016005630 A1 11/2017
(Continued)

OTHER PUBLICATIONS

International Search Report and Written Opinion dated Sep. 22, 2023 in related/corresponding International Application No. PCT/EP2023/057598.
(Continued)

*Primary Examiner* — Mussa A Shaawat
(74) *Attorney, Agent, or Firm* — PATENT PORTFOLIO BUILDERS PLLC

(57) ABSTRACT

Assigning vehicles to charging stations involves a vehicle exchanging information with a charging station network, the information including at least vehicle configuration parameters and charging process information. The vehicle is assigned by a computing unit, taking into account the information, to a charging station to carry out a charging process. The vehicle reports a first vehicle configuration to the charging station network, the charging station network determines the charging process information depending on the first vehicle configuration and transmits this information to the vehicle, and the vehicle adapts at least one vehicle configuration parameter depending on the charging process information obtained from the charging station network in (Continued)

order to set a second vehicle configuration before the charging process is carried out.

9 Claims, 2 Drawing Sheets

(51) Int. Cl.

| | | |
|---|---|---|
| *B60L 53/62* | (2019.01) | |
| *B60L 53/65* | (2019.01) | |
| *B60L 53/68* | (2019.01) | |

(58) Field of Classification Search
CPC ..... Y02T 10/7072; Y02T 90/12; Y02T 90/16; B60Y 2200/91
See application file for complete search history.

(56) References Cited

U.S. PATENT DOCUMENTS

| | | | |
|---|---|---|---|
| 11,340,083 B2 | 5/2022 | Wilding et al. | |
| 2011/0144844 A1* | 6/2011 | Ishibashi | H02J 7/04 |
| | | | 320/109 |
| 2013/0179061 A1 | 7/2013 | Gadh et al. | |
| 2014/0184170 A1 | 7/2014 | Jeong | |
| 2017/0087999 A1* | 3/2017 | Miller | G01C 21/3679 |
| 2017/0168493 A1* | 6/2017 | Miller | B60L 53/63 |
| 2019/0308520 A1* | 10/2019 | Ward | G01C 21/3407 |
| 2019/0351783 A1* | 11/2019 | Goei | G08G 1/202 |
| 2019/0383637 A1* | 12/2019 | Teske | G01C 21/3676 |
| 2019/0389315 A1* | 12/2019 | Zhu | B60L 53/64 |
| 2020/0055419 A1* | 2/2020 | Kim | G06Q 10/02 |
| 2020/0333151 A1* | 10/2020 | Akhtar | B60L 53/64 |
| 2021/0008998 A1* | 1/2021 | Bode | B60L 53/60 |
| 2021/0061132 A1 | 3/2021 | Stefanziosa | |
| 2021/0081624 A1* | 3/2021 | Kovarik | G06K 7/10376 |
| 2021/0318685 A1* | 10/2021 | Jenkins | G06Q 30/018 |
| 2023/0256860 A1* | 8/2023 | Marcos Moreira Da Silva | H02J 1/10 |
| | | | 307/9.1 |
| 2024/0140247 A1* | 5/2024 | Kromrey | B60L 53/66 |

FOREIGN PATENT DOCUMENTS

| | | |
|---|---|---|
| DE | 102017118616 A1 | 2/2018 |
| DE | 102018201472 A1 | 8/2019 |
| DE | 102020103102 A1 | 8/2020 |
| DE | 102020200651 A1 | 8/2020 |
| JP | 2019095196 A | 6/2019 |
| JP | 2021040402 A | 3/2021 |
| WO | 2013132449 A1 | 9/2013 |
| WO | 2014162648 A1 | 10/2014 |
| WO | 2020084964 A1 | 4/2020 |

OTHER PUBLICATIONS

Office Action created Jan. 4, 2023 in related/corresponding DE Application No. 10 2022 001 267.7.

Office Action dated Nov. 18, 2025 in related/corresponding JP Application No. 2024-559135.

* cited by examiner

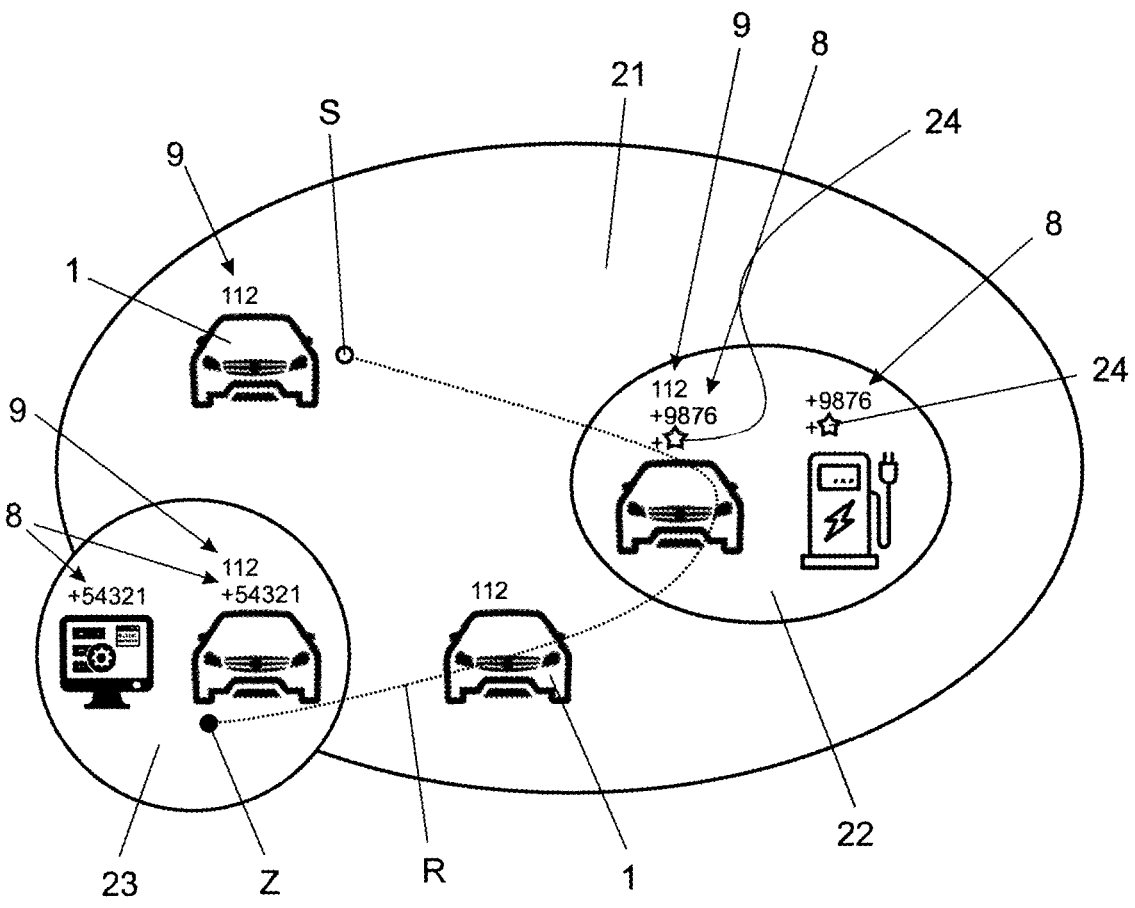
<u>Fig. 3</u>

METHOD FOR ASSIGNING VEHICLES TO CHARGING STATIONS, AND CHARGING SYSTEM

BACKGROUND AND SUMMARY OF THE INVENTION

Exemplary embodiments of the invention relate to a method for assigning vehicles to charging stations, as well as to a charging system.

To stockpile drive energy, electrified vehicles can have an electric energy store, such as a traction battery. To charge the traction battery, a corresponding vehicle carries out a charging process at a charging station. Such a charging station can be privately operated, for example in the form of a so-called wall box, or else public charging stations of a charging infrastructure operator can be used.

To carry out a charging process, the exchange of information between the vehicle user or the vehicle and the operator of the charging infrastructure is necessary. This exchange of information, for example, provides the transmission of charging parameters to be used, such as charging voltage or charging capacity, as well as personal data, which enables the charging process to be billed. This exchange of information is comparatively simple and usually only takes place via a corresponding charging cable or the manual input of information via an operating terminal attached to a charging station or a mobile end device of the vehicle user connected to said operating terminal.

A data processing unit for communication between at least one motor vehicle and between a plurality of charging stations for charging an energy storage device of a motor vehicle is known from DE 10 2016 005 630 A1. The data processing unit enables extensive communication between vehicles and charging stations, which enables the exchange of a wide variety of information between corresponding actors. In this way, the vehicles are able to inform the charging stations of the charging state of a particular electric energy store of the respective vehicle at a specific point in time and the maximum charging capacity that can be used to carry out a charging process. The charging stations can in turn inform the vehicles of a charging capacity available during a time window. The data processing unit then derives a strategy for assigning vehicles to charging stations in terms of time and/or location, so that predefined parameters are adhered to when charging processes are carried out. For example, the vehicles can be distributed to charging stations in such a way that power grid supplying the latter is not overloaded. The automated derivation of the strategy for assigning vehicles to charging stations by the data processing unit reduces the effort required to carry out charging processes, shortens the waiting time at a corresponding charging station and enables efficient utilization of these stations.

Exemplary embodiments of the present invention are directed to the problem of providing an improved method for assigning vehicles to charging stations and a corresponding charging system used for this purpose, with the aid of which the efficiency and/or safety when carrying out charging processes is further increased.

With a method for assigning vehicles to charging stations of the type mentioned above, a vehicle, the electric energy store of which is to be charged, directly or indirectly wirelessly exchanges information with a charging station network, wherein the information comprises at least vehicle configuration parameters and charging process information, wherein the vehicle is assigned by a computing unit, taking into account the information, to a charging station to carry out a charging process. The generic method is further developed according to the invention in that the vehicle reports a first vehicle configuration to the charging station network, the charging station network determines the charging process information depending on the first vehicle configuration and transmits this information to the vehicle, and the vehicle adapts at least one vehicle configuration parameter depending on the charging process information obtained from the charging station network in order to set a second vehicle configuration before the charging process is carried out.

The method according to the invention makes it possible to further improve the efficiency and/or safety of charging processes compared to the prior art. For example, the prior art provides that the computing unit obtains information from vehicles and the charging station network and then distributes the vehicles to corresponding charging stations in the charging station network depending on the information obtained. According to the invention, however, the vehicles and the charging station network enter into a dialogue, whereby the vehicles are able to change their first vehicle configuration into a second vehicle configuration depending on the charging process information obtained from the charging station network. By changing the vehicle configuration, there are changed boundary conditions for carrying out charging processes, which enables the vehicles to be assigned to the charging stations even more efficiently. In other words, the vehicles adapt to the boundary conditions set by the charging station network in order to carry out a charging process under changed boundary conditions.

The following examples will explain this in more detail: In a first example, the first vehicle configuration provides that a partially discharged electric energy store of the vehicle, for example a traction battery, is only to be charged when a critical charging state, for example, 20 percent of the maximum capacity has been reached. The charging station network currently only has a low utilization rate, which means that unused resources such as unoccupied charging stations and voltage reserves in the energy grid remain unused. The charging station network then uses the charging process information to distribute an offer that charging can be carried out at a reduced electricity tariff within a certain period of time, for example within the next two hours. The vehicle can then change its strategy and allow charging to take place, even if the traction battery is still charged to more than the aforementioned critical 20 percent, for example 60 percent. The vehicle can decide independently to carry out a charging process, or it can proactively inform a vehicle user of the offer made by the charging station network, so that the vehicle user gives the vehicle the order to carry out the charging process. Overall, this leads to several vehicles deciding to charge in the time window of the favorable electricity tariff, which on the one hand leads to improved utilization of the charging stations and the power grid, and on the other hand offers the advantage of reduced charging costs for vehicle users.

In a second example, the vehicle configuration parameters can provide values for different charging speeds that can be used by the vehicle. A charging speed can, for example, be expressed directly by the unit kWh per time unit or Ah per minute or similar, or also indirectly, for example by a charging voltage to be selected. Different electricity tariffs can then be included in the charging process information for different charging speeds, for example an expensive electricity tariff for a high charging voltage and a low-cost electricity tariff for a comparatively low charging voltage.

The vehicle can then decide automatically or the vehicle user manually in favor of a certain charging speed to carry out the charging process. However, as the vehicle moves to a charging station assigned to the vehicle, the boundary conditions for carrying out charging processes change. For example, the utilization of the charging station network can increase spontaneously and/or a power grid that supplies the latter can reach its load limit. As a result, for example, a certain comparatively high charging capacity may no longer be provided or may only be available at increased costs. The vehicle then changes the first vehicle configuration to the second vehicle configuration in order to still carry out the charging process adapted to the changed boundary conditions. For example, the vehicle can accept a higher electricity tariff or accept the charging process with a lower charging voltage.

In general, it is also possible for the vehicle and the charging station network to exchange information during a charging process and for the vehicle to change its vehicle configuration to a third vehicle configuration during the charging process, for example by changing vehicle configuration parameters. Referring back to the previous example, the vehicle could then, for example, carry out the charging process again with a comparatively higher charging voltage when the utilization of the power grid decreases.

In addition, different independent or interdependent boundary conditions can be defined, which are simultaneously relevant for the execution of charging processes. These boundary conditions can take into account technical aspects such as a charging speed, battery life, charging process duration, a date, utilization of the charging station network and/or the power grid supplying the latter, available charging interfaces, and/or the like. Business aspects can also be taken into account, such as special offers, electricity tariffs based on the utilization of the power grid, a vehicle user's schedule (e.g., running errands while the vehicle user has parked their vehicle), or similar. A vehicle user can also define a fixed boundary condition that their vehicle should be charged regardless of any other boundary conditions. This allows a person short on time to charge their vehicle, even if this would otherwise not be possible due to other boundary conditions, for example because no free charging station would be available. For example, a second person who is not dependent on their vehicle in the near future could configure their vehicle so that the charging process is paused in order to release the occupied charging station for the person short on time. Accordingly, the second person can be remunerated for releasing the charging station and a higher electricity tariff can be demanded from the person who is short on time.

Any proven wireless communication technologies can be used for communication between the vehicle and the charging station network. Preferably, the vehicle and charging station network can communicate via mobile radio, in particular via 2G to 6G or future communication protocols. Communication can also take place via WLAN, in particular using the WIFI protocol, Bluetooth, NFC, ZigBee, or similar. In general, any vehicle-to-X and/or vehicle-to-infrastructure interface can be used. This enables information to be exchanged between the vehicle and the charging station network, even if the vehicle is located at a distance from a designated charging station. Communication between the vehicle and charging station network can therefore take place directly, i.e., the vehicle is coupled directly to a part of the charging station network, such as a communication relay or a charging station. However, communication can also take place indirectly, for example via a central computing unit such as a cloud server or a backend. The corresponding cloud server can be operated by a service provider. Possible service providers include the vehicle manufacturer of the vehicle, a smart city operator, a smart grid operator, and/or the charging station network operator. The charging station network can also include several charging station providers, for example a municipal energy supplier and a private company. This increases the convenience for the vehicle user when using the method according to the invention, as the charging stations of different charging station providers can be conveniently used to carry out charging processes. The computing unit that assigns the vehicle to a charging station can be the cloud server, for example. In general, however, a corresponding computing unit can also be integrated into a part of the charging station network, such as a specific charging station.

For example, one of the following vehicle configuration parameters can be changed in order to adapt the vehicle configuration: A maximum electricity tariff up to which the performance of a charging process is to be carried out, an offered electricity tariff at which the performance of a charging process is to be initiated independently from other boundary conditions, a minimum or maximum charge of the traction battery, for example to ensure a desired minimum range with the vehicle, a charging curve to be used, a charging power, charging voltage and/or charging current strength to be used, a desired charging speed, in particular maximum and/or minimum values for this, and/or similar.

A planned use of the vehicle to carry out charging operations can also be taken into account. If, for example, a longer journey is to be made with the vehicle at short notice, the charging process must be planned in such a way that sufficient energy reserves are available in the traction battery to enable the journey to be made. A vehicle user's schedule can also be analyzed to find a suitable time window to carry out the charging process. This can be used, for example, to determine when the vehicle user wants to use the vehicle and corresponding free time periods are utilized to carry out charging processes. This allows the vehicle to change its vehicle configuration from 'Standby', in which the vehicle must be ready for use by the vehicle user, to 'Idle', in which the vehicle is ready to carry out charging processes.

An advantageous further development of the method provides that to adapt one of the configuration parameters, the vehicle activates preconditioning of the electric energy store. The preconditioning of the electric energy storage can include temperature control thereof. If the vehicle has already been in use for some time, for example, a traction battery in the vehicle may have heated up. If, on the other hand, the vehicle has been stationary for a relatively long time, the traction battery will typically have reached the ambient temperature. In particular, in winter the traction battery will accordingly have a low temperature. Carrying out a charging process may require the traction battery to have a temperature within an authorized temperature range, for example in the range between 5° C. and 70° C. By starting the preconditioning of the electric energy store before the charging process is carried out, the waiting time for carrying out the charging process can be reduced. For example, the traction battery can be cooled or warmed up as soon as the vehicle arrives at the designated charging station. This ensures that the temperature of the traction battery is within the authorized temperature range for charging when the vehicle arrives at the charging station. However, the preconditioning of the electric energy store can also go beyond pure temperature control and include, for example, the targeted implementation of cell equalization processes, also known as 'cell balancing'.

According to a further advantageous embodiment of the method according to the invention, the charging station network conveys charging-process-specific interface usage information to the vehicle, which authorizes the vehicle and enables it to exchange information via an exchange interface between the vehicle and third parties and/or the vehicle and the charging station network when a specified event occurs. Conveying interface usage information to the vehicle can be linked to boundary conditions. For example, the transmission of interface usage information can only be triggered at a specific time or time window and/or when the vehicle is within a certain radius of a designated charging station. With the aid of the interface usage information, the vehicle is able to react to specific events, such as an emergency situation. For example, a defined event can be a defect in the charging station, a malfunction, or even a fire, for example in the charging station and/or the vehicle. The exchange interface can be a hardware and/or software interface. The interface usage information enables the vehicle to exchange information via the corresponding exchange interface. For example, the information can include a switch-off signal to disconnect the power supply to the charging station from the mains. If there is a fire, for example, the vehicle can thereby control the charging station and cut the power connection to the mains. The vehicle can therefore control the charging station remotely via the exchange interface. In other words, the interface usage information can be an authorization for issuing control commands from the vehicle to the charging station. This interface usage information can comprise just a single command or else a collection of commands that can be issued by the vehicle depending on the event that occurs.

A further advantageous embodiment of the method according to the invention provides that the charging station network conveys a charging-process-specific emergency call number as charging-process-specific interface usage information to the vehicle, after which, in order to adapt one of the configuration parameters, the vehicle sets the charging-process-specific emergency call number as a reference emergency call number for establishing a communication link in an emergency.

Nowadays, vehicles are increasingly being equipped with the so-called eCall system. With the help of eCall, it is possible to automatically detect the occurrence of an accident and notify the emergency services. A verbal communication link can be established with a rescue control center. Typically, only a standard reference emergency call number is stored in the vehicle for this purpose. By setting a charging-process-specific emergency call number as a reference emergency call number, the vehicle is able to react to a corresponding emergency situation. The number of a local fire station in the vicinity of the charging station can be stored as an emergency call number, for example. This can be called by the vehicle to inform it of a fire at the charging station and/or the vehicle. For example, the vehicle can play an automated help message and/or establish a verbal communication link with the relevant emergency services. Verbal communication can take place from the vehicle, for example via a hands-free system coupled to an in-vehicle telecommunications unit or, if the vehicle user is absent from the vehicle, via a mobile device used by the vehicle user. For example, a corresponding application can be executed on the mobile end device, such as a smartphone, which establishes a communication link with the local fire station via the mobile end device and a cloud server of a service provider, for example the computing unit. This shortens the rescue chain for initiating emergency measures. The telecommunications unit can also be used to transmit digital data and thus realize data exchange with the Internet via a mobile phone network, for example.

Additionally, or alternatively, a service number of an operator of the charging station network can also be stored as a charging-process-specific emergency call number, for example. This means that the operator can be contacted directly in the event of a fault and, if necessary, provide initial tips on how to rectify faults.

A corresponding emergency call number can be defined individually for each charging process or for each charging station or group of several charging stations. An emergency call number otherwise stored in the vehicle can be at least temporarily overwritten by the charging-process-specific emergency call number and/or contacted in addition to the charging-process-specific emergency call number.

According to a further advantageous embodiment of the method according to the invention, the first and/or second vehicle configuration comprises safety charging parameters, by means of which it is reported to the charging station network that the charging process is to take place with a charging speed, charging capacity, charging current strength, charging voltage, charging duration, and/or charging energy quantity that is/are reduced in comparison to standard charging parameters. In other words, this allows an alternative charging curve to be specified, which makes it possible to carry out a charging process while at the same time saving the vehicle's traction battery. Depending on a response from the charging station network, i.e., the charging process information, the vehicle can set a 'battery saver mode' by setting the second vehicle configuration. It is also possible for the vehicle to set the battery saver mode according to the first vehicle configuration and adapt individual parameters after receiving and analyzing the charging process information to set the second vehicle configuration. If it is not possible to carry out a charging process with the battery saver mode according to the first vehicle configuration, an alternative battery saver mode can be activated. If, for example, the charging capacity, charging voltage and/or charging current strength cannot be changed, a shorter charging time can be set, which prevents the traction battery from heating up too much, for example.

A further advantageous embodiment of the method further provides that the first and/or second vehicle configuration comprises a minimum charging state threshold value, up to which the electric energy store is to be filled during the charging process at least up to a specified point in time. Depending on the selected vehicle configuration and the agreed conditions for carrying out charging processes with the charging station network, it is possible, for example, that the charging process of the vehicle is terminated prematurely and/or is carried out at least temporarily with a reduced charging power. The vehicle and the charging station network can agree on the minimum charging state threshold value up to which the vehicle's traction battery should at least be charged by the specified point in time. This increases convenience for the vehicle user, as the vehicle user can thus be sure that the traction battery of their vehicle will definitely be charged to the minimum charging state threshold at the agreed point in time. This gives the vehicle user peace of mind if they want to drive a comparatively long distance with the vehicle after the charging process has been completed. The vehicle can only set the minimum charging state threshold value in the second vehicle configuration or also in the first vehicle configuration, whereupon the minimum charging state threshold value is adapted following the exchange of information with the charging station network. Any other boundary conditions can be taken into account for this adaptation, for example a lower minimum charging state threshold value if charging is possible at a lower electricity tariff or a higher minimum charging state threshold value if charging is possible at a higher charging capacity or similar.

According to a further advantageous embodiment of the method, the vehicle navigates at least in a semi-automated manner to the charging station and, on arrival at the charging station, automatically releases a charging interface lock of the charging interface of the vehicle for an authorized person. The degree of automation of vehicles will continue to increase in the future. In future, fleets of at least semi-automated or even autonomous vehicles will be used on the roads. One possible scenario is that people no longer own their own vehicles, but share vehicles from a vehicle pool, whereby the utilization of a vehicle can be increased from a few minutes or hours a day to almost full utilization. In particular, the question arises as to how the energy store of such vehicles should be filled in order to maintain the operation of the vehicle fleet as efficiently as possible. The invention provides for such vehicles to drive at least semi-automatically or even autonomously to the respective designated charging station and to release their charging interface there for an authorized person, for example a charging station attendant, so that the charging station attendant can electrically couple the vehicle with the charging station in order to carry out the charging process. In the process, the vehicle changes its vehicle configuration from 'Charging interface lock locked' to 'Charging interface lock unlocked'. With appropriately designed vehicles and charging stations, automated electrical (de) coupling of vehicles and charging stations is also conceivable.

Preferably, information is exchanged between the vehicle and the charging station network and/or the vehicle configuration is adapted independently of an operating mode of the vehicle. The vehicle can adopt different operation modes. When the vehicle is parked, the vehicle's ignition is usually switched off and various computing units such as control units can be switched off or operated in standby mode. Depending on the intended use, other computing units in the vehicle can be gradually activated from standby mode to begin their work. Finally, the vehicle's ignition can be activated and the vehicle's engine started. Lastly, the vehicle's required computing units are activated so that the vehicle can drive off. The doors of the vehicle can each be locked or unlocked at different points in time. Of particular relevance is the state of a telecommunications unit, also known as a TCU, which is responsible for communication between the vehicle and the charging station network. The TCU can be designed in such a way that the exchange of information between the vehicle and the charging station network is also ensured while the TCU is operating in standby mode. The TCU preferably has various communication protocols to enable the exchange of information, even if, for example, only a WIFI access point is within communication range instead of a mobile phone network or the vehicle is coupled to a charging station of the charging station network via the TCU using Bluetooth. The more computing units of the vehicle are operated in standby mode or are deactivated, the more power-efficiently the method according to the invention can be carried out, which counteracts a discharge of the vehicle's traction battery while the vehicle is stationary. The method according to the invention can thus reduce the risk of an excessively discharged traction battery. If the charging state of the traction battery drops too low, the vehicle can initiate a charging process at an early stage and/or even move autonomously to a charging station.

In a charging system having a vehicle having an at least partially electrified drivetrain with an electric energy store, having a charging station network which comprises at least one charging station, and having a computing unit, the vehicle, the charging station network and the computing unit are set up in accordance with the invention to carry out a method described above. The vehicle can be any vehicle such as a car, lorry, van, bus or similar. The vehicle can be designed as a pure battery electric vehicle or also as a hybrid. The charging station network can cover any geographical extent and have any number of charging stations and/or charging station clusters. Different charging stations of the charging station network can also be operated by different operating firms. The computing unit can be a part of the charging station network or be external thereto. The computing unit is preferably a central computing unit such as a cloud server of a service provider, also known as a backend. The backend can, for example, be operated by a vehicle manufacturer, a municipal energy supplier, a charging station network operator or similar.

Access to information exchanged between the individual actors involved in the implementation of the method according to the invention or between different components of the charging system is possible in different ways. The corresponding information can be automatically processed by the vehicle and the charging station network. It is also possible for a user to manually view and/or manipulate at least parts of the information. For example, software can be executed on a computing unit in the vehicle that allows access to the relevant information via a human-machine interface installed in the vehicle. For example, a vehicle user can operate this software via a touchscreen in the vehicle and thereby view the vehicle configuration and change vehicle configuration parameters, for example to set the second vehicle configuration. This is also possible via a mobile end device on which a corresponding application is executed and which is coupled directly, for example by cable and/or Bluetooth, to the vehicle or indirectly to the vehicle via a central computing unit, for example the aforementioned computing unit. The vehicle user can also access a service provided by the computing unit, i.e. the cloud server, from their PC at home via an Internet browser and a corresponding Internet portal and thus adjust the vehicle configuration.

Further advantageous embodiments of the method according to the invention for assigning vehicles to charging stations and of the charging system according to the invention result from the exemplary embodiments which are described in more detail below with reference to the figures.

BRIEF DESCRIPTION OF THE DRAWING FIGURES

Here:

FIG. 3 shows a schematic plan view of a vehicle which moves between different places and changes its vehicle configuration in the process.

DETAILED DESCRIPTION

Figure 1:
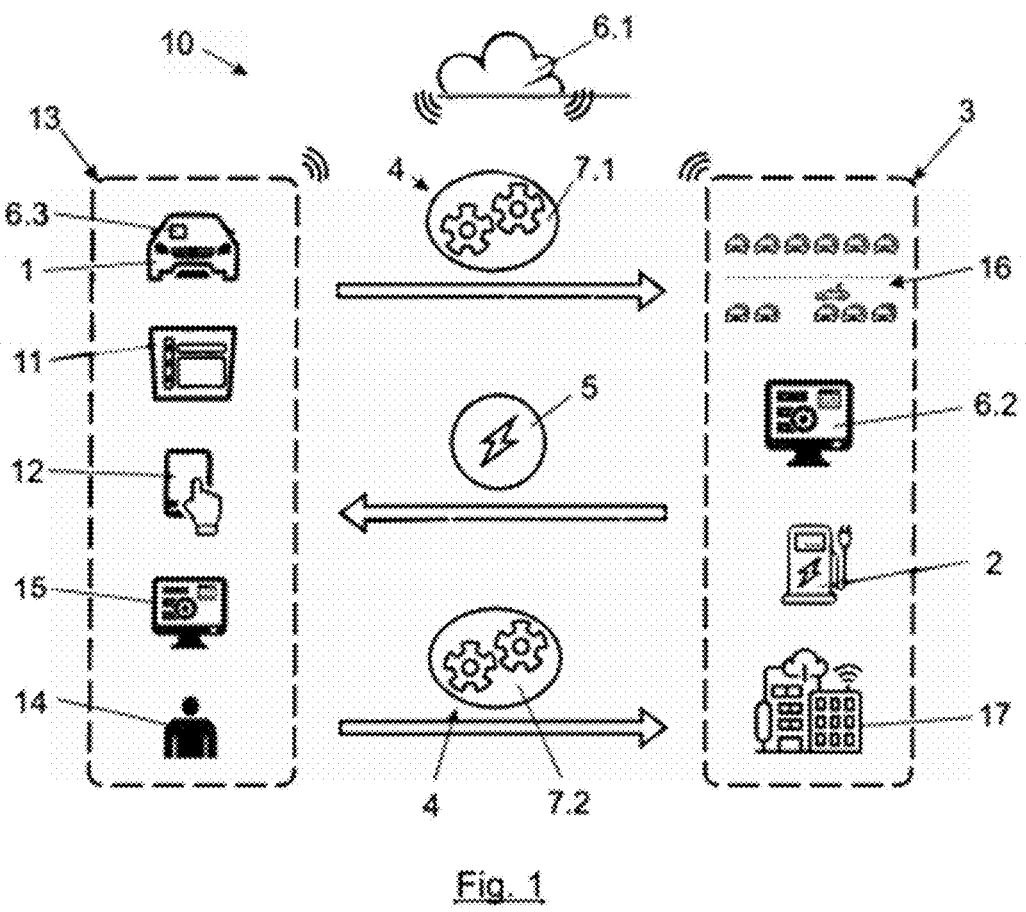
FIG. 1 shows a schematic representation of a charging system according to the invention.

FIG. 1 shows a charging system 10 according to the invention in a schematic representation. The charging system 10 comprises vehicle actors 13 and a charging station network 3. A central part of the vehicle actors 13 are a vehicle 1 having an electrified drivetrain and an electric energy store, for example, in the form of a traction battery. The vehicle 1 has a vehicle configuration 7.1 and 7.2 that can be set by configuration parameters 4. The vehicle configuration 7.1, 7.2 can be set automatically by the vehicle 1, i.e., by a computing unit 6.3 integrated in the vehicle 1, or by a vehicle user 14 entering a manual operating action via an in-vehicle human-machine interface 11, a mobile terminal 12, for example a smartphone, which is directly or indirectly coupled to the vehicle 1, or also via a PC 15 external to the vehicle, which is coupled to the vehicle 1, in particular indirectly via a cloud server, for example. For example, the cloud server may be a computing unit 6.1. In general, it is also possible that the mobile terminal 12 and/or the vehicle-external PC 15 can automatically cause the vehicle-internal computing unit 6.3 to change the vehicle configuration 7.1, 7.2.

The charging station network 3 comprises at least one charging station 2, which can, for example, be part of a vehicle fleet station 16, also known as automated valet parking (AVP), and/or part of a smart city 17 or smart grid. A computing unit 6.2 is also part of the charging station network 3 and is used to manage corresponding charging stations 2, vehicle fleet stations 16 and/or smart cities 17 or smart grids. Communication between vehicle actors 13 and the charging station network 3 take place in FIG. 1 indirectly via the computing unit 6.1. In particular, the computing unit 6.1 is a cloud server of a service provider for providing the method according to the invention.

For assigning vehicles 1 to charging stations 2, a corresponding vehicle 1 first transmits vehicle configuration parameters 4, which correspond to a first vehicle configuration 7.1, to the charging station network 3. The charging station network 3 then determines charging process information 5 depending on the first vehicle configuration 7.1 and transmits this back to the vehicle 1. The vehicle 1 then changes its vehicle configuration into a second vehicle configuration 7.2 by adapting at least one vehicle configuration parameter 4 and transmits this back to the charging station network 3, before starting an appropriate charging process to charge the vehicle's traction battery 1. The assignment of a charging station 2 to a vehicle 1 can take place before or after the vehicle 1 sets the second vehicle configuration 7.2. It is also possible that an alternative charging station 2 is assigned to the vehicle 1 after setting the second vehicle configuration 7.2. For this purpose, the charging station network 3 can also convey charging process information 5 to the vehicle 1 again (not shown).

By the exchange of information shown in FIG. 1 between the vehicle actors 13, especially the vehicle 1, and the charging station network 3, the vehicle 1 and the charging station network 3 enter into a dialogue and are thus able to adapt and renegotiate the boundary conditions applicable to carrying out a charging process of vehicle 1 at a charging station 2 of the charging station network 3 both during the planning of the charging process and, if necessary, during the current charging process. This enables a particularly efficient, cost-effective and safe assignment of vehicles 1 to charging stations 2.

Figure 2:
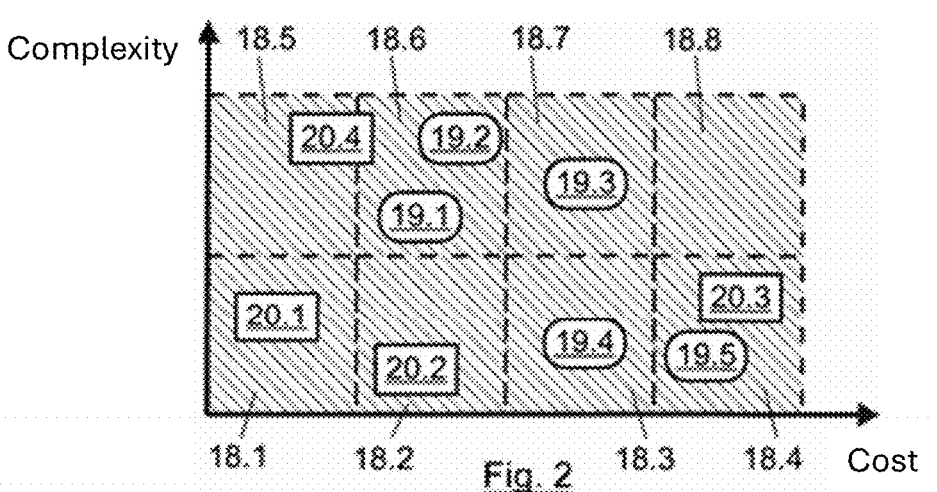
FIG. 2 shows a schematic diagram to illustrate the correlation between the costs incurred during a charging process and the complexity of assigning vehicles to charging stations.

To this end, FIG. 2 shows a schematic diagram to illustrate the correlation between the costs incurred during a charging process and the complexity of assigning the vehicles 1 to the charging station 2. The charging costs are plotted on the abscissa of the diagram and the complexity in the assignment of vehicles 1 to the charging stations 2 is plotted on the ordinate of the diagram. The diagram is subdivided into eight fields 18.1 to 18.8. User boundary conditions 19.1 to 19.5 and operator boundary conditions 20.1 to 20.4 are shown.

A first user boundary condition 19.1 provides that the vehicle 1 is to only carry out a charging process when the actual electricity tariff of the charging station network 3 is favorable. A second user boundary condition 19.2 provides that the charging process is to be carried out as soon as a charging station 2 is free. A third user boundary condition 19.3 provides that a charging process is to be carried out as soon as it is necessary, for example, because the charging state of the traction battery of the vehicle 1 has fallen below a critical value or threatens to not be able to provide a range required for a planned journey with the vehicle 1. A fourth user boundary condition 19.4 provides that the charging process is to be carried out until the vehicle user 14 has returned to their vehicle 1. For example, the vehicle user 14 can drive with their vehicle 1 into the city center and do errands there while the vehicle 1 is then to be charged in the meantime when it is parked in a car park with a charging station 2. According to a fifth user boundary condition 19.5, all other boundary conditions are overwritten and in each case the charging process is to be carried out.

In the case of a first operator boundary condition 20.1, a weekend offer with a particularly favorable electricity tariff is available. According to a second operator boundary condition 20.2, there is currently a low capacity utilization of the charging station 2 of the charging station network 3. According to a third operator boundary condition 20.3, there is conversely a high capacity utilization of the charging station 2 of the charging station network 3. According to a fourth operator boundary condition 20.4, there is a high demand for optimization for assigning vehicles 1 to charging stations 2, for example because the vehicles 1 are lined up in a charging queue. The complexity therefore increases further with the boundary conditions set for the vehicles waiting in the charging queue. The more vehicles 1 specify different boundary conditions for carrying out charging operations, the more effort is required to distribute the vehicles to the charging stations 2.

Different vehicles 1 can, for example, specify different charging speeds, maintaining a battery saving mode, carrying out the charging process at a certain time or on a certain day or at a certain time of day, the use of certain charging interfaces, and/or the use of different charging parameters or the like as boundary conditions.

FIG. 3 shows a vehicle 1 in a public space 21. The vehicle 1 moves from a start point S along a route R to a destination point Z. In the process it performs a charging process inside a charging station space 22 and a charging process in a fleet parking space 23.

A reference emergency call number 9 is stored in the vehicle 1 which the vehicle 1 can automatically contact when an emergency occurs. For example, in Germany the emergency call number is 112. This may be an emergency call number used for a so-called eCall system.

If the vehicle 1 now enters the charging station space 22, it is notified, for example by the corresponding charging station 2, the computing unit 6.1 or the computing unit 6.2, of a charging-process-specific emergency call number 8 that is valid for the designated charging station 2. This charging-process-specific emergency call number 8 is indicated in FIG. 3 by the exemplary emergency call number 9876. If there is an emergency, for example the charging station 2 and/or the vehicle 1 is on fire, the vehicle 1 can select the charging-process-specific emergency call number 8 and thus call for help. For example, the charging-process-specific emergency call number 8 may be an operator of the charging station 2, a communal operating firm of the charging station 2, such as municipal utilities or also a local fire station. Multiple charging-process-specific emergency call numbers 8 can also be stored in the vehicle 1. Additionally, or alternatively, an emergency shutdown authorization 24 can also be stored in the vehicle 1, which authorizes the vehicle 1 to control the charging station 2, for example in case of fire, and to cut a power connection of the charging station 2 to the mains. The emergency shutdown authorization 24 can be received and also used by the vehicle 1, for example via WIFI, Bluetooth, NFC, or similar or also via a cable, for example via the charging cable.

The reference emergency call number 9 can be temporarily deactivated when staying in the charging station space 22, or can also be contacted in addition to the charging-process-specific emergency call number 8.

When leaving the charging station space 22, the corresponding charging-process-specific emergency call number 8 and emergency shutdown authorization 24 are removed from vehicle 1.

When the vehicle 1 enters the fleet parking space 23, an alternative charging-process-specific emergency call number 8 is stored in the vehicle 1, which is indicated here, for example, by the numbers 54321. If there is now an emergency in the fleet parking space 23, then a different entity than the one in the charging station space 22 is contacted, especially one that is on site and can initiate help particularly quickly. By implementing charging-process-specific emergency call numbers 8, the rescue chain can be shortened in an emergency, which further increases safety when charging processes are being carried out. This safety can be further improved by the possibility of remote control of a corresponding charging station 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for assigning vehicles to charging stations, the method comprising:
exchanging information directly or indirectly wirelessly with a charging station network between a vehicle having an electric energy store to be charged and a charging station, wherein the information comprises at least vehicle configuration parameters and charging process information; and
assigning, by a computing unit and accounting for the information, the vehicle to one of the charging stations to perform a charging process,
wherein the vehicle reports a first vehicle configuration to the charging station network, the charging station network determines the charging process information depending on the first vehicle configuration and transmits the charging process information to the vehicle, and the vehicle adapts at least one vehicle configuration parameter depending on the charging process information obtained from the charging station network to set a second vehicle configuration before the charging process is carried out,
wherein the charging station network conveys charging-process-specific interface usage information to the vehicle, the charging-process-specific interface usage information authorizes the vehicle and enables the vehicle to exchange information, when a specified event occurs, via an exchange interface between the vehicle and third parties or the charging station network, and
wherein the charging station network conveys a charging-process-specific emergency call number as charging-process-specific interface usage information to the vehicle, after which, to adapt one of the vehicle configuration parameters, the vehicle sets the charging-process-specific emergency call number as a reference emergency call number for establishing a communication link in an emergency.

2. The method of claim 1, wherein, to adapt one of the vehicle configuration parameters, the vehicle activates preconditioning of the electric energy store.

3. The method of claim 1, wherein the first or second vehicle configuration comprises safety charging parameters allowing it to be reported to the charging station network that the charging process is to take place with a charging speed, charging capacity, charging current strength, charging voltage, charging duration, or charging energy quantity that is/are reduced compared to standard charging parameters.

4. The method of claim 1, wherein the first or second vehicle configuration comprises a minimum charging state threshold value, up to which the electric energy store is to be filled during the charging process at least up to a specified point in time.

5. The method of claim 1, wherein the vehicle navigates at least in a semi-automated manner to the charging station and, on arrival at the charging station the vehicle automatically releases a charging interface lock of the charging interface of the vehicle for an authorized person.

6. The method of claim 1, wherein
the information is exchanged between the vehicle and the charging station network, or
the vehicle configuration is adapted independently of an operating mode of the vehicle.

7. The method of claim 1, wherein the wireless exchange of information takes place between the vehicle and the charging station network by WLAN, Bluetooth, NFC, ZigBee, or 2G to 6G mobile radio.

8. A charging system comprising:
a vehicle having an at least partially electrified drivetrain with an electric energy store to be charged;
a charging station network comprising at least one charging station; and
a computing unit,
wherein the vehicle and the at least one charging station are configured to exchange information directly or indirectly wirelessly, wherein the information comprises at least vehicle configuration parameters and charging process information, wherein the computing unit is configured to assign, accounting for the information, the vehicle to one of the charging stations to perform a charging process, wherein the vehicle is configured to report a first vehicle configuration to the charging station network, the charging station network is configured to determine the charging process information depending on the first vehicle configuration, the charging station network is configured to transmit the charging process information to the vehicle, and the vehicle is configured to adapt at least one vehicle configuration parameter depending on the charging process information obtained from the charging station network to set a second vehicle configuration before the charging process is carried out, wherein the charging station network is configured to convey charging-process-specific interface usage information to the vehicle, the charging-process-specific interface usage information authorizes the vehicle and enables the vehicle to exchange information, when a specified event occurs, via an exchange interface between the vehicle and third parties or the charging station network, and wherein the charging station network is configured to convey a charging-process-specific emergency call number as charging-process-specific interface usage information to the vehicle, after which, to adapt one of the vehicle configuration parameters, the vehicle is configured to set the charging-process-specific emergency call number as a reference emergency call number for establishing a communication link in an emergency.

9. The charging system of claim 8, wherein the vehicle is configured to adapt a vehicle configuration parameter by inputting a manual control action via an in-vehicle human-machine interface or via a mobile end device coupled directly or indirectly to the vehicle.

* * * * *